(12) United States Patent
Cagliari

(10) Patent No.: US 7,941,944 B2
(45) Date of Patent: May 17, 2011

(54) TONGUE FOR SPORTS BOOTS

(75) Inventor: Peter Cagliari, Montebelluna (IT)

(73) Assignee: Lisa Lange International SĀRL, Fribourg (CH)

( * ) Notice: Subject to any disclaimer, the term of this patent is extended or adjusted under 35 U.S.C. 154(b) by 894 days.

(21) Appl. No.: 11/900,186

(22) Filed: Sep. 10, 2007

(65) Prior Publication Data

US 2008/0060222 A1 Mar. 13, 2008

(30) Foreign Application Priority Data

Sep. 11, 2006 (EP) .................................. 06425624

(51) Int. Cl.
*A43B 23/26* (2006.01)
(52) U.S. Cl. .............................. 36/54; 36/117.6; 36/10
(58) Field of Classification Search ........... 36/54, 117.6, 36/10
See application file for complete search history.

(56) References Cited

U.S. PATENT DOCUMENTS

| 1,355,323 | A | * | 10/1920 | Fox .................................. 36/54 |
| 1,753,415 | A | * | 4/1930 | McKnight ........................ 36/54 |
| 2,139,858 | A | * | 12/1938 | Schwartz et al. ................ 36/54 |
| 2,242,353 | A | | 9/1940 | Gillis |
| 4,149,323 | A | * | 4/1979 | Roy .................................. 36/48 |
| 4,534,122 | A | * | 8/1985 | MacPhail ......................... 36/88 |
| 5,050,319 | A | | 9/1991 | Perotto et al. |
| 5,701,688 | A | * | 12/1997 | Crowley ...................... 36/72 R |
| 7,685,744 | B2 | * | 3/2010 | Lundy et al. .................... 36/44 |
| 2005/0210707 | A1 | | 9/2005 | Labonte |

FOREIGN PATENT DOCUMENTS

| CH | 626793 | 12/1981 |
| DE | 1 680 320 U | 7/1954 |
| DE | 81 03 473.3 U | 7/1981 |
| EP | 0 370 948 A | 5/1990 |

OTHER PUBLICATIONS

Search report issued by European Patent Office for priority application EP 06425624.1 dated Feb. 20, 2007, 6 pages.

* cited by examiner

*Primary Examiner* — Ted Kavanaugh
(74) *Attorney, Agent, or Firm* — Frommer Lawrence & Haug LLP; Ronald R. Santucci

(57) ABSTRACT

A sports boot tongue, which comprises a comfort element (5) positioned directly on its surface (4) designed to be oriented toward the inside of the sports boot in order to come into contact with the foot or the leg of a user, this comfort element (5) fulfilling a first technical function of absorbing shocks and a second technical function of reducing friction and sliding by shearing.

20 Claims, 2 Drawing Sheets

TONGUE FOR SPORTS BOOTS

This application claims priority benefits to European Patent Application No. 06425624.1 filed Sep. 11, 2006, the disclosure of which is hereby incorporated by reference.

The invention relates to a tongue for sports boots, particularly designed for boots used in gliding sports such as skiing, snowboarding or skating. It also relates to a method for manufacturing such a tongue. Lastly, it also relates to a sport boot and/or to an inner liner as such that comprise a tongue of this type.

DESCRIPTION OF THE PRIOR ART

According to the prior art, a ski boot is composed of a rigid upper surrounding a comfort liner into which the skier slides his foot. A liner of this type comprises a tongue in its front part, which can be moved aside, by pressure from the foot, through a notch in the boot upper in order to make it easier to put the boot on and take it off. When skiing, the skier's tibia bears on the boot tongue during bending in order to guide the gliding device. In order to limit pain points on the tibia, the tongue comprises, within its structure, a layer of foam that absorbs the shocks exerted on the tibia. This foam is covered on the inner face of the tongue with a fabric that protects the foam from rapid wear owing to the numerous instances of frictional contact against the skier's leg and that prevents, furthermore, direct contact between it and the snow. This fabric also enables the tongue to have an attractive aesthetic appearance. Document EP 0 370 948 illustrates a prior-art construction of this type, in which cutouts have furthermore been provided in the outer surface of the tongue in order to allow a comfort foam of this type to be displayed and to enhance the attractive nature of the liner. A drawback of a prior-art tongue of this type is, however, the deficient level of comfort it affords. Indeed, the numerous instances of friction between the tongue fabric and the tibia of a skier during skiing gives rise to pain points on the tibia. Furthermore, the prior-art solutions do not allow a satisfactory aesthetic appearance to be achieved.

These same problems and drawbacks arise in many other sports.

There is thus a need for a new sports boot tongue structure that does not have the drawbacks of the prior-art solutions.

SUMMARY OF THE INVENTION

More specifically, a first object of the present invention consists in proposing a sports boot tongue that improves user comfort.

A second object of the present invention consists in proposing a sports boot tongue that has an attractive aesthetic appearance.

A third object of the present invention consists in proposing a sports boot tongue whose method of manufacture is advantageous from the economic standpoint.

According to the concept of the invention, a comfort element that fulfils a first technical function of absorbing shocks and a second technical function of reducing friction and sliding of the foot or of the tibia on the tongue is arranged directly on the surface of the tongue so as to come into contact with the foot or the leg of the user.

The invention is defined more precisely by the claims.

These objects, characteristics and advantages of the present invention will be set out in detail in the following description of a particular, non-limiting embodiment given in connection with the attached figures, in which:

DESCRIPTION OF THE PREFERRED EMBODIMENTS

Figure 1:
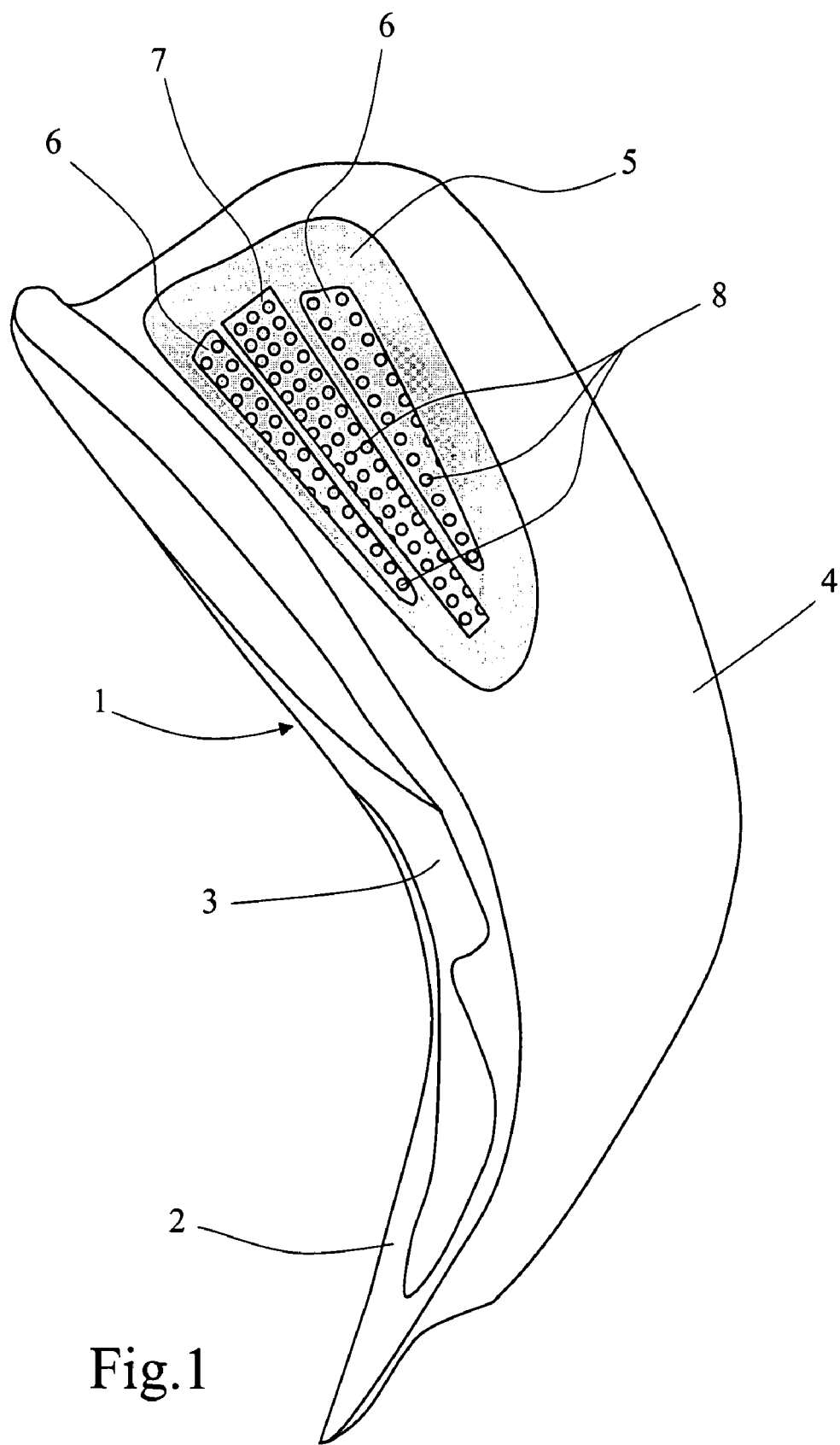
FIG. 1 is a rear perspective view of a sports boot tongue according to one embodiment of the invention.
Figure 2:
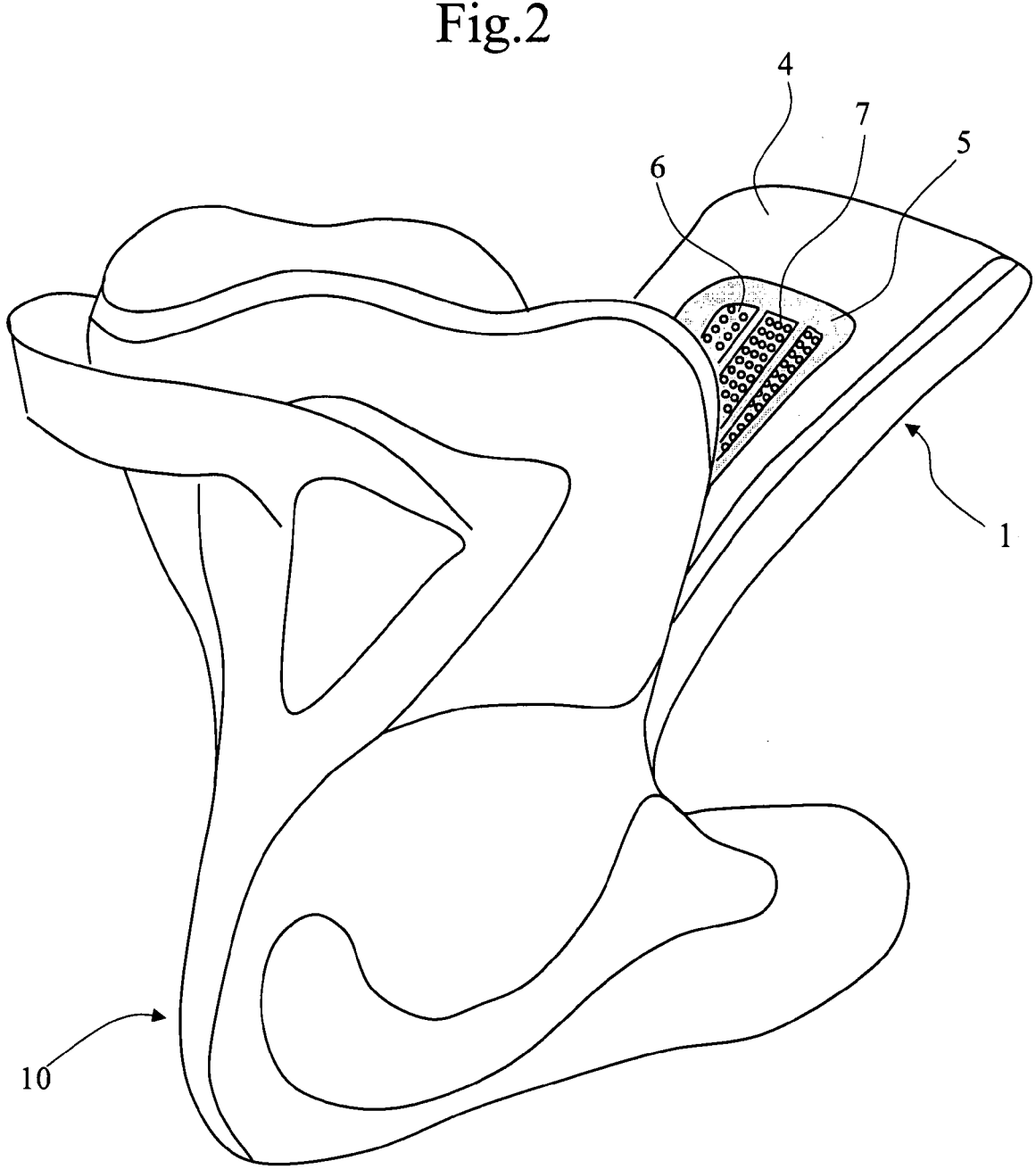
FIG. 2 is a rear perspective view of a ski boot liner that incorporates the tongue of FIG. 1.

In FIGS. 1 and 2, the concept of the invention is illustrated within the context of a tongue 1 designed for a liner 10 for a ski boot. However, this concept could be implemented in respect of any other sports boot, particularly tall boots that come into contact with the user's tibia. For example, this concept could be implemented on snowboarding boots, hiking boots, skating boots, and the like.

According to the embodiment of the invention shown in FIG. 1, the sports boot tongue 1 has a first face 2 that optionally incorporates reinforcements 3 and a second face 4 designed to come into direct contact with the foot and the tibia of a user, an expression considered in the wide sense throughout the text and that includes bearing on a sock or item of clothing of the user. According to the invention, the comfort element 5 is arranged directly on the fabric covering this second face 4, in its upper part, on the outside of the tongue. This comfort element 5 fulfils two principal functions of absorbing shocks and of limiting friction vis-à-vis a user's tibia.

In order to fulfil these two technical functions, the comfort element 5 is made from a flexible, adhesive material. In the embodiment shown, it has two lateral protuberant parts 6 that extend substantially vertically so as to be able to surround a user's tibia and form a housing for this tibia that bears lightly only on a central protuberant element 7. The two lateral parts 6 limit the approach of the tibia to the comfort element 5 and thus limit the pain points arising from contact of the tibia with the tongue 1. Furthermore, the comfort element is made from an adhesive material in order to adhere to a user's lower leg or, more precisely, to his sock, in order thus to greatly reduce sliding of the user's leg relative to the tongue and to eliminate pain points arising from the resulting friction. To that end, the comfort element 5 is deformed by shearing forces exerted between the surface 4 of the tongue on the one hand and the user's leg on the other. The material used thus has a high elongation at break. Finally, according to the variant embodiment proposed, the different protuberant elements 6, 7 have holes 8 that increase their shock-absorbing property and their ability to deform and thus their adhesive effect.

In order to achieve the technical effects sought, a flexible material is thus required that is of a sufficient thickness—between 3 and 10 mm—to fulfil the function of absorbing shocks. A material of this type thus also generally has an adhesive property that is markedly superior to that of fabrics generally used. Advantageously, a strong material will be selected that has the best possible combination between the properties of shock-absorption and adhesion, for example, a polyurethane or a silicone in the form of a gel of low hardness. In general, a hardness of below 15 Shore A would be suitable. Similarly, a low-hardness rubber could be suitable. As a further example, an SEBS-based thermoplastic elastomer-type material, such as the product marketed as Linea Verde LV.PRENE 391 could be used. The invention is not limited to the above examples—any material that has the properties described above could be suitable.

The comfort element 5 is of optimum size to fulfil its comfort functions in the region of the skier's tibia, while not impeding putting-on and taking-off of the boot. To that end, it extends at most over the top upper half of the tongue. Thus, during a phase of putting the boot on and taking it off, the skier's foot slides over the fabric of the tongue in the region of its lower part and the comfort element added has no negative effect.

The invention also relates to the method for manufacturing a sports boot tongue of this type, which comprises the following step:

injection or pouring of a mono- or bi-component material, such as polyurethane or a silicone gel, into a mold in order to form a comfort element 5 directly on the outer face 4 of the tongue designed to come into contact with the foot or the lower leg of the user.

In order advantageously to implement such a method with injection, a material is used that can be injected at low temperature in order to avoid damage to the fabric.

In a variant embodiment, the comfort element may be fixed to the inner surface of the tongue by any fixing means, such as adhesive bonding, welding, stitching, etc.

Lastly, the solution successfully achieves the objects sought and offers the following advantages:

the tongue has the ability to absorb shocks directly in contact with the user's tibia, which optimally enhances its shock-absorbing effect;

the tongue, furthermore, has a characteristic of reducing or of practically eliminating sliding of the tibia over the tongue, which greatly enhances its comfort; and the tongue has a visible comfort element that creates a visual impression of comfort and whose design may vary while still achieving the technical effects sought, in order to create an attractive aesthetic effect and to enhance the technical function.

In the preceding embodiments, the invention has been implemented on a ski boot liner tongue. It could, however, also be implemented on other sports boots, even, optionally, on low boots in which the tongue gives rise to pain points where it is in friction with a user's instep. The dimensions of the comfort element will be adapted to the use required.

The invention claimed is:

1. A sports boot liner having a tongue, wherein the tongue comprises a comfort element (5) positioned directly on a surface (4) of the tongue, the comfort element oriented toward the inside of the sports boot such that, when in use, the comfort element comes into contact with the leg of a user, this comfort element (5) fulfilling a first technical function of absorbing shocks and a second technical function of reducing friction and sliding by shearing.

2. The sports boot liner as claimed in claim 1, wherein the comfort element (5) is made from a flexible, adhesive material.

3. The sports boot liner as claimed in claim 1, which has a length capable of coming into contact with the tibia of a user and wherein the comfort element extends at most over the upper half of the tongue.

4. The sports boot liner as claimed in claim 1, which has a length capable of coming into contact with the instep of a user and wherein the comfort element extends at most over the upper half of the tongue.

5. The sports boot liner as claimed in claim 1, wherein the comfort element (5) is fixed on a fabric of the surface (4) of the tongue.

6. The sports boot liner as claimed in claim 1, wherein the comfort element (5) has two protuberant lateral parts (6).

7. The sports boot liner as claimed in claim 6, wherein the comfort element (5) has a central protuberant part (7).

8. The sports boot liner as claimed in claim 6, wherein at least a part of the protuberant parts (6, 7) has holes (8).

9. The sports boot liner as claimed in claim 1, wherein the comfort element (5) is made from a polyurethane or a silicone with a hardness of less than 15 Shore A.

10. The sports boot liner as claimed in claim 1, wherein the comfort element (5) is made from an SEBS-based thermoplastic elastomer.

11. A sports boot having a tongue, wherein the tongue comprises a comfort element (5) positioned directly on a surface (4) of the tongue, the comfort element oriented toward the inside of the sports boot such that, when in use, the comfort element comes into contact with the leg of a user, this comfort element (5) fulfilling a first technical function of absorbing shocks and a second technical function of reducing friction and sliding by shearing.

12. The sports boot as claimed in claim 11, wherein the comfort element (5) is made from a flexible, adhesive material.

13. The sports boot as claimed in claim 11, which has a length capable of coming into contact with the tibia of a user and wherein the comfort element extends at most over the upper half of the tongue.

14. The sports boot as claimed in claim 11, which has a length capable of coming into contact with the instep of a user and wherein the comfort element extends at most over the upper half of the tongue.

15. The sports boot as claimed in claim 11, wherein the comfort element (5) is fixed on a fabric of the surface (4) of the tongue.

16. The sports boot as claimed in claim 11, wherein the comfort element (5) has two protuberant lateral parts (6).

17. The sports boot as claimed in claim 16, wherein the comfort element (5) has a central protuberant part (7).

18. The sports boot as claimed in claim 16, wherein at least a part of the protuberant parts (6, 7) has holes (8).

19. The sports boot as claimed in claim 11, wherein the comfort element (5) is made from a polyurethane or a silicone with a hardness of less than 15 Shore A.

20. The sports boot as claimed in claim 11, wherein the comfort element (5) is made from an SEBS-based thermoplastic elastomer.

* * * * *